United States Patent
Tilke et al.

(10) Patent No.: US 7,133,779 B2
(45) Date of Patent: Nov. 7, 2006

(54) AUTOMATED BOREHOLE GEOLOGY AND PETROPHYSICS INTERPRETATION USING IMAGE LOGS

(75) Inventors: Peter Gerhard Tilke, Ridgefield, CT (US); David Allen, Brookfield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 196 days.

(21) Appl. No.: 10/838,557

(22) Filed: May 4, 2004

(65) Prior Publication Data

US 2004/0225441 A1     Nov. 11, 2004

Related U.S. Application Data

(60) Provisional application No. 60/468,938, filed on May 8, 2003.

(51) Int. Cl.
*G01V 1/50* (2006.01)
*G01V 3/18* (2006.01)

(52) U.S. Cl. .................. 702/9; 702/7; 702/11

(58) Field of Classification Search .............. 702/7, 702/9, 11, 6; 324/303, 338, 339
See application file for complete search history.

(56) References Cited

U.S. PATENT DOCUMENTS 5,486,762 A * 1/1996 Freedman et al. .......... 324/303
6,388,947 B1 5/2002 Washbourne et al. ......... 367/73

2004/0008027 A1 1/2004 Prammer ................. 324/303

FOREIGN PATENT DOCUMENTS

WO   WO01/31365 A1   5/2001

OTHER PUBLICATIONS

Bloomfield, P. *Fourier Analysis of Time Series:* An Introduction. 2nd Edition, Wiley (2000), pp. 21-23.
Castelli, V. et al. *Image Databases—Search and Retrieval of Digital Imagery*. Chapter 5, Tilke, P. Images in the Exploration for Oil and Gas. John Wiley & Sons, Inc. (2002) pp. 107-137.

(Continued)

*Primary Examiner*—Donald McElheny, Jr.
(74) *Attorney, Agent, or Firm*—Jody Lynn DeStefanis; William L. Wang; Dale Gaudier

(57) ABSTRACT

A method of characterizing a borehole traversing an earth formation including (a) obtaining an array of data from a formation characterization tool, wherein the data describes a section of the borehole; (b) computing at least one spatial characteristic describing the relative position of pairs of data; (c) assigning said pairs of data to bins based on the spatial characteristic, wherein the size of the bins are selected based on the tool; (d) transforming the data to petrophysical properties of the borehole; (e) calculating the variance of each bin; (f) developing a model of the variances; (g) determining at least one geostatistical parameter using the model; and (h) upscaling the geostatistical parameters to characterize a region of said earth formation. The method may further include generating a heterogeneity index log using the geostatistical model parameters. The method may be implemented using a computer program product for processing and interpreting borehole data.

20 Claims, 16 Drawing Sheets

OTHER PUBLICATIONS

Clark I. *Practical Geostatistics* Elsevier Applied Science Publishers, Ltd. (1984) pp. 1-68.

Cressie, N. *Fitting Variogram Models by Weighted Least Squares.* Mathematical Geology, vol. 17, No. 5 (1985) pp. 563-588.

Delhomme, J.P. et al. *Permeability and Porosity Upscaling in the Near-Wellbore Domain: The Contribution of Borehole Electrical Images.* SPE 36822 (1996).

Deutsch, C. *Geostatistical Reservoir Modeling.* Oxford University Press (2002), pp. 101-152.

Fanchi, J.R. *Shared Earth Modeling—Methodologies for Integrated Reservoir Simulations.* Elsevier (2002) pp. 60-62.

Frykman, P. et al. Geostatistical Scaling Laws Applied to Core and Log Data. SPE 56822 (1999).

Galford, J.E. et al. *Enhanced Resolution Processing of Compensated Neutron Logs.* SPE Formation Evaluation, No. 15541 (Jun. 1989) pp. 131-137.

Newberry, B.M. et al. Analysis of Carbonate Dual Porosity Systems from Borehole Electrical Images. SPE 35158 (1996) pp. 123-129.

Zhang, X.F. et al. *On the Weighted Least-Squares Method for Fitting a Semivariogram Model.* Computers and Geosciences vol. 21, No. 4 (1995) pp. 605-608.

*Guide to the Expression of Uncertainty in Measurement.* Publication of the International Organization for Standardization (1993) Chapter 3 Basic Concepts pp. 4-8 and Annex D pp. 40-44.

\* cited by examiner

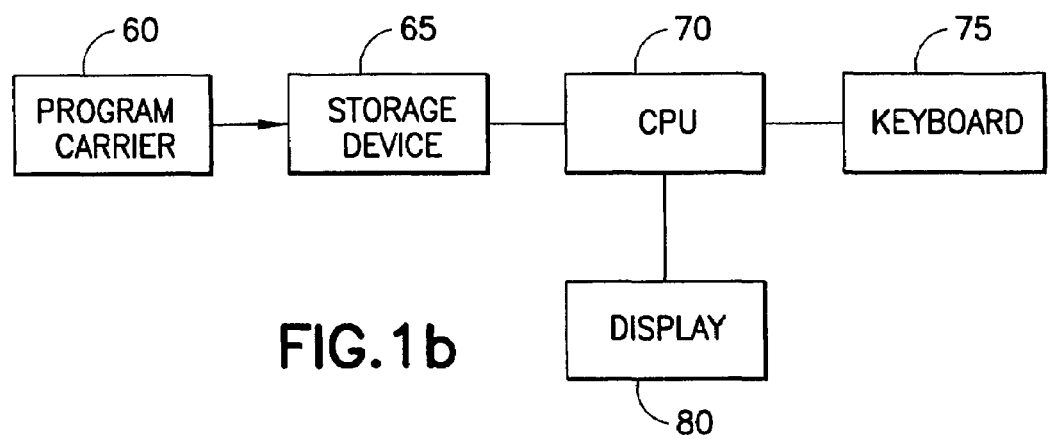
FIG.1b
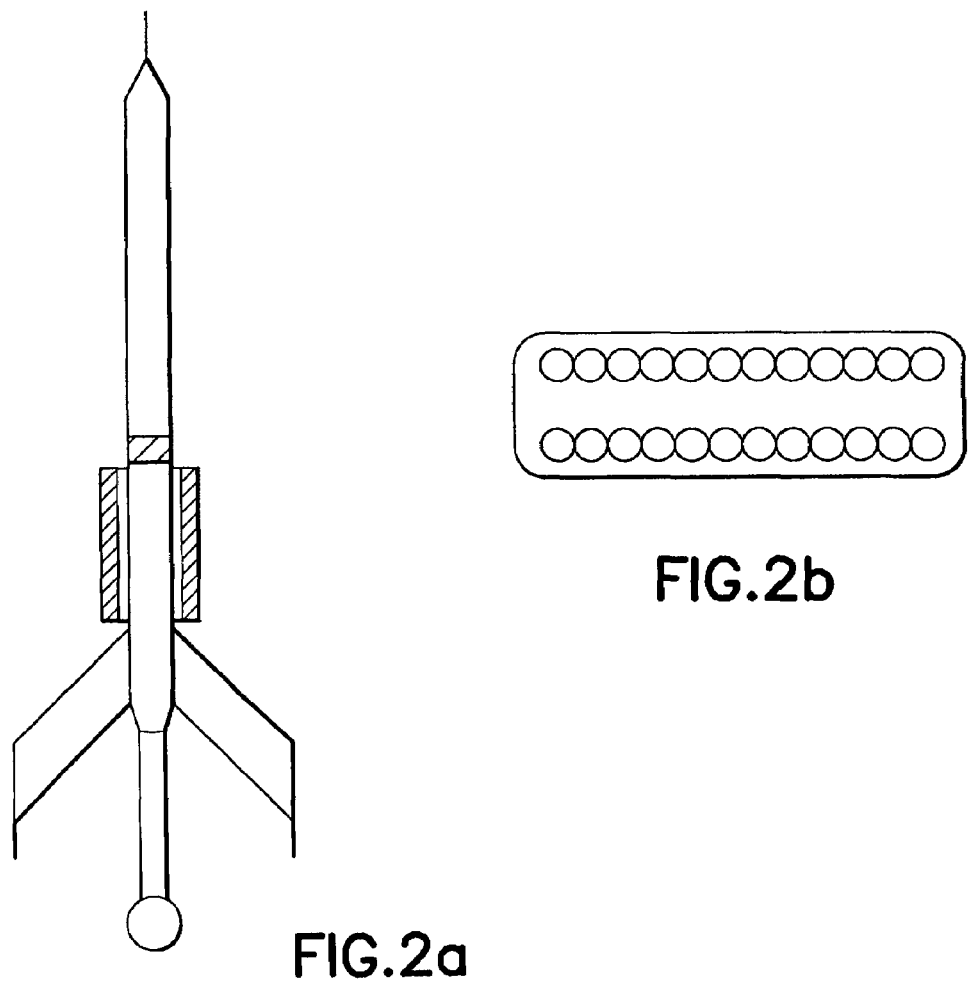
FIG.2b
FIG.2a

AUTOMATED BOREHOLE GEOLOGY AND PETROPHYSICS INTERPRETATION USING IMAGE LOGS

The present patent application claims priority to U.S. Provisional Patent Application No. 60/468,938, filed May 8, 2003, incorporated by reference herein in its entirety.

FIELD OF INVENTION

The present invention relates to a method to quantitatively describe the formation heterogeneity at the resolution scale of the imagery and, more particularly, to a method that applies the techniques of geometric statistics (geostatistics) to borehole imagery measurements.

BACKGROUND OF THE INVENTION

Borehole imagery is a major component of the wireline business (for example, Schlumberger's FMI™, Formation MicroScanner, OBMI™ Tools), and an increasing part of the logging while drilling business (Schlumberger's GeoVision™) (as described by Tilke, "Imagery in the Exploration for Oil and Gas", published in Castelli et al., *Image Databases* (2002) Wiley, page 608, incorporated by reference herein in its entirety). While these measurements contain abundant data about the subsurface, it remains a challenge to automatically extract the important geological and petrophysical knowledge contained therein. The precise and efficient extraction of this knowledge from the images increases their utility, and therefore will increase the demand for these measurements.

Schlumberger has a long interest in developing techniques for automatically interpreting and extracting features from borehole imagery. Many of the most successful techniques in this area have been implemented in Schlumberger's BorTex™, PoroSpect™ and BorDip™ applications. BorTex™ semi-automatically segments an image into areas of similar texture that correlate with different rock types. BorTex™ can further identify "spots" and "patches" from images for quantification of vugs and connectivity in carbonates. PoroSpect™ on the other hand transforms an FMI™ conductivity image to a porosity image (see below), then affords the opportunity to analyze the porosity distributions in a statistical sense. Finally, BorDip™ analyzes discontinuities in the images to automatically identify stratigraphic and structural dips, and fractures.

A limitation of these approaches to automated heterogeneity analysis from borehole image interpretation is that they involve treating the borehole image as a two-dimensional image to which image processing techniques are applied.

While there is a long history of academic and industrial approaches to the automated interpretation and modeling of borehole imagery (e.g. BorTeX™), there is limited academic or applied work on the application of geostatistical techniques for this purpose.

The recognition that borehole images can be mapped to petrophysical properties is well understood (see Delhomme et al., "Permeability and Porosity Upscaling in the Near-Wellbore Domain: The Contribution of Borehole Electrical Images", (1996) SPE 36822 and Newberry et al., "Analysis of Carbonate Dual Porosity Systems from Borehole Electrical Images", (1996) SPE 35158, incorporated by reference herein in their entireties).

Perhaps the best established transformation is that from resistivity to porosity space using the classic Archie saturation equation (see Fanchi et al., "Shared Earth Modeling" (2002) Elsevier, page 306, incorporated by reference herein in its entirety):

$$S_w^n = \frac{aR_{mf}}{\Phi^m R_{xo}} \quad (1)$$

where $S_w$ is the saturation of the wetting phase (0.00–1.00), n is the saturation exponent, $\alpha$ depends on the tortuosity (0.35–4.78), $R_{mf}$ is the resistivity of the mud filtrate, $\Phi$ is the porosity (0.00–1.00), m is the cementation exponent (1.14–2.52), and $R_{xo}$ is the resistivity of the flushed zone.

This relationship can be rearranged as follows:

$$\Phi = \left(\frac{aR_{mf}}{S_w^n R_{xo}}\right)^{\frac{1}{m}} \quad (2)$$

The PoroSpect™ application transforms the resistivity image data into porosity ($\Phi$) using Equation (2) where the remaining Archie's parameters are either input by the user or derived from other logs. A 1.2-inch vertical window is then applied to these data to generate and analyze a porosity distribution histogram for every depth (0.1 inch vertical spacing) (see Newberry et al., "Analysis of Carbonate Dual Porosity Systems from Borehole Electrical Images", (1996) SPE 35158). This technique has proven very powerful in identifying some aspects of porosity distribution such as dual-porosity. Note however, this technique effectively collapses the image data into a histogram, discarding spatial information (other than depth). It does not consider the three-dimensional geometry of the FMI™ sensors in the borehole.

An approach to analyze the geostatistical variation of porosity as seen in FMS borehole imagery has been suggested previously (see Delhomme et al., "Permeability and Porosity Upscaling in the Near-Wellbore Domain: The Contribution of Borehole Electrical Images", (1996) SPE 36822). It is suggested that the geostatistics on a single pad can be analyzed for fine scale heterogeneity, and intermediate scale heterogeneity can be modeled across pads.

One object of the present invention is to provide a method to model formation heterogeneity in terms of geological or petrophysical properties.

SUMMARY OF THE INVENTION

The present invention describes a novel approach to quantitatively describe the formation heterogeneity at the resolution scale of the imagery by applying the techniques of geometric statistics (geostatistics) to borehole imagery measurements (FMIM, Formation MicroScanner, OBMI™, etc.). It is noted that while the examples provided herein are directed to Schlumberger's FMI™ tool, the method may be applied to nearly all borehole imagery tools.

The geostatistical parameters, which represent the geological and petrophysical heterogeneity at the scale of the borehole image measurements, are then used to model the heterogeneity at measurement scales representing larger volumes of investigation (e.g. core plug, porosity logs, resistivity logs). These modeled parameters can then be used to describe the uncertainty in formation properties at any scale given measurements taken at a particular scale and are presented as single channel logs.

An immediate application of this technique is found in carbonates where lateral heterogeneity calls in to question the utility of conventional logging tools (e.g. porosity) to determine average formation properties. The technique may also be applied to the interpretation of clastics.

The present invention provides an approach to automated borehole image interpretation that treats the borehole as a three-dimensional entity in which the tool sensors measure a geological or petrophysical property. This property is thereby modeled in three-dimensions, and the techniques of modern geometrical statistics (geostatistics) can be applied.

A significant benefit of modeling the three dimensional geostatistics of the borehole is that geometric and statistical transformations can then be applied to the modeled parameters. An immediate application of this is the ability to "upscale" the modeled parameters. As will be described below in this document, this allows us to ascribe a heterogeneity index (defined below) to some of the other measurements whose values are averaged over larger volumes of investigation, e.g. core plugs and logging tools.

The present invention treats borehole images as three-dimensional measurements of the geological and petrophysical properties of the rock. The technique then uses the established techniques of geostatistics (see Clark, *Practical Geostatistics*, Elsevier Applied Science Publishers, Ltd. (1984), incorporated by reference herein in its entirety) to model the three-dimensional geological and petrophysical heterogeneity of the rock in the region of the borehole.

The present invention also discusses the presentation of the modeled parameters as single channel logs summarizing the geology and petrophysics observed by the imagery.

These geostatistical parameters, which represent the statistical variability at the scale of the borehole image measurements, are then used to model the statistical variability at measurement scales representing larger volumes of investigation (e.g. core plug, porosity logs, resistivity logs). These modeled parameters can then be used to describe the accuracy of these larger scale measurements in representing the mean formation properties and differences expected between them due to their differing volumes of investigation.

Examples are presented where this technique has been applied to a carbonate well, where lateral heterogeneity calls in to question the accuracy of conventional logging tools (e.g. porosity).

One embodiment of the present invention is a method of characterizing a borehole traversing an earth formation, comprising: (a) obtaining an array of data from a formation characterization tool, wherein the data describes a section of the borehole; (b) computing at least one spatial characteristics describing the relative position of pairs of data; (c) assigning the pairs of data to bins based on the spatial characteristic, wherein the size of the bins are selected based on the resolution of the tool; (d) transforming the data to petrophysical properties of the borehole; (e) determining the variance of each bin; (f) developing a model of the variances; (g) determining the at least one geostatistical parameter using the model; and (h) upscaling the geostatistical parameter to characterize a region of the earth formation. The method may further include generating a heterogeneity index log using the geostatistical model parameters. It is preferred that the array of data describes a substantially continuous section of borehole. While non-continuous data may be used, this data may result in "empty" bins and gaps in the geostatical model. The coordinates of the data (relative to the region of investigation) may be determined, such as based on the borehole geometry, tool geometry, and tool orientation which are obtained as part of the measurements. Accordingly, the spatial characteristics describing pairs of data may be based on the distance between data pairs, the depth of data pairs in the borehole or within the region of investigation, and the orientation of the data pairs (i.e. the azimuth). The data may be upscaled to a three-dimensional model using the relative or absolute distance between data pairs and the orientation or azimuth of the data pairs.

The variance model may be developed by (a) computing the variance of the spatial characteristic of each bin; (b) computing an experimental semi-variogram using the variances; (c) deriving a model semi-variogram from the experimental semi-variogram; and (d) determining the geostatical parameters using the model semi-variogram.

The method of the present invention may be implemented using a computer program product for processing and interpreting borehole data, comprising a computer useable medium having computer readable program code embodied in the medium for processing borehole data, the computer program product having (i) computer readable program code means for computing spatial characteristics describing the relative position of pairs of data, wherein the data describes a borehole; (ii) computer program code means for assigning said pairs of data to bins based on the spatial characteristic, wherein the size of the bins are selected based on the tool used to collect the data; (iii) computer program code means for transforming the data to petrophysical properties of the borehole; (iv) computer program code means for determining the variance of each bin; (v) computer program code means for developing a model of the variances; (vi) computer program code means for determining at least one geostatistical parameter using the model; and (vii) computer program code means for upscaling the geostatistical parameter to characterize a region of the earth formation. The computer program may further comprise a computer program code means for generating a heterogeneity index log using the geostatistical model parameter.

Further features and applications of the present invention will become more readily apparent from the figures and detailed description that follows.

BRIEF DESCRIPTION OF THE DRAWINGS

FIG. 1(*b*) shows one implementation of the present invention.

FIG. 2(*a*) is a schematic of the FMI™ Tool having the four pairs of pads and flaps generating 192 measurements per depth; FIG. 2(*b*) is a detail of one pad.

DETAILED DESCRIPTION OF THE INVENTION

As noted above, one embodiment of the present invention provides an output of a series of single channel logs describing the geological and petrophysical heterogeneity of a borehole. While porosity ($\Phi$) will be used as a measure of this heterogeneity, and FMI™ imagery will be used as the source measurements, one skilled in the art will recognize that other parameters and imagery sources may be suitably employed in accordance with the present invention.

Figure 1A:
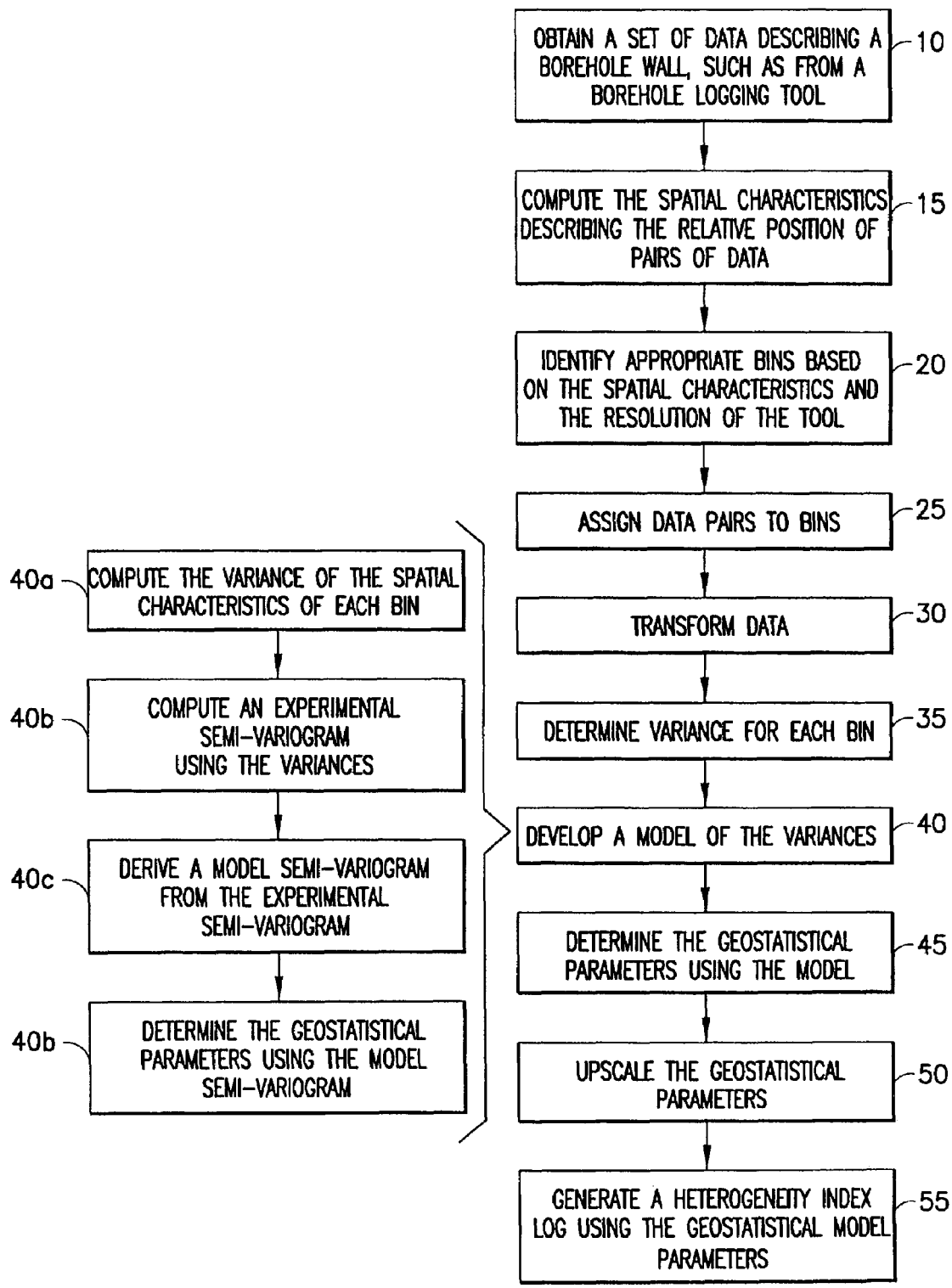
FIG. 1(*a*) is a flow chart showing one embodiment of the method of the present invention.

In one embodiment, the generation of the heterogeneity logs involves the following steps, as shown in FIG. 1(a):

1. Obtain an array of data describing (or imaging) a section of the borehole wall, for example, a 2D array of pixels describing the borehole wall 10.
2. Compute the spatial characteristics describing the relative position of the pairs of data 15. This may include calculating the coordinates (such as the 3D Cartesian coordinates) of the data from hole geometry, tool geometry, and tool orientation to determine the depth of, distance between or orientation (azimuth) of the data pairs.
3. Identify appropriate bins, such as based on the spatial characteristics selected and/or the resolution of the tool 20. This may be performed for a given depth(s). The size of these bins will be dependent upon the tool used to acquire the data.
4. Assign data pairs to bins representing similar spatial relationships 25.
5. Transform the data values as desired 30, for instance normalized FMI™ resistivity ($R_{xo}$) pixels may be transformed to porosity ($\Phi$) pixels. Other possibilities include but are not limited to grouping the pixels by their measurement value into bins using either new or preexisting image analysis techniques.
6. Determine the $\Phi$ variance for each bin 35 and develop a model of the variance 40. This variance model may be developed by computing the variance of each bin 40a, computing an experimental semi-variogram 40b by computing the $\Phi$ variance for each bin, then deriving a model semi-variogram from the experimental semi-variogram 40c, thereby determining the modeled geostatistical parameters 40d and making them available for further processing or display.
7. Determine the geostatistical parameters from the modeled variance 45 and compute the same parameters for measurements with larger volumes of investigation using upscaling approaches 50.
8. The up-scaled geostatistical model parameters can then be used to generate heterogeneity index logs for corresponding core and logging measurements 55.

These methods may be implemented on a computer readable medium, such as one shown in FIG. 1(b) having a program carrier 60, a storage device 65, a processing unit 70, a keyboard (75) or other data input mechanism and a display 80 or other output mechanism.

These steps and potential extensions are described in greater detail in the following sections. While the example provided herein is a vertical well of constant width having horizontal layers, the method may be easily extended to deviated wells with varied width, having nonhorizontal dip and azimuth.

Compute Three-Dimensional Sensor Geometry

Borehole imaging tools produce images of the measured parameter (resistivity, acoustic impedance, density, etc.) on the rock face. At a given depth, the exact geometry of the pixels is therefore a function of the hole diameter at that location and the sensor configuration. Thus, given the orientation of the borehole, the azimuthal orientation of the tool, and the diameter of the hole (all of which are recorded), the 3D Cartesian coordinate of every pixel is known.

Note that while the technique presented here is general, for simplicity the FMI™ Tool is used to illustrate the technique. It is noted, however, that the present methodology may be easily adapted for use with other imaging tools.

The FMI™ Tool (shown in FIGS. 2(a) and (b)) is comprised of four pairs of pads and flaps. Each pad and flap (see FIG. 2(b)) has 24 resistivity sensors resulting in 192 sensors per depth (8×24). The four arms of the tool expand in the borehole so that the pads and flaps press against the rock face. At a given depth, the sensor geometry is therefore a function of the hole diameter at that location (shown in FIGS. 3(a) and (b)). Thus, given the orientation of the borehole, the azimuthal orientation of the FMI™ Tool, and the diameter of the hole (all of which are recorded); the 3D position of every sensor is known.

Figure 3B:
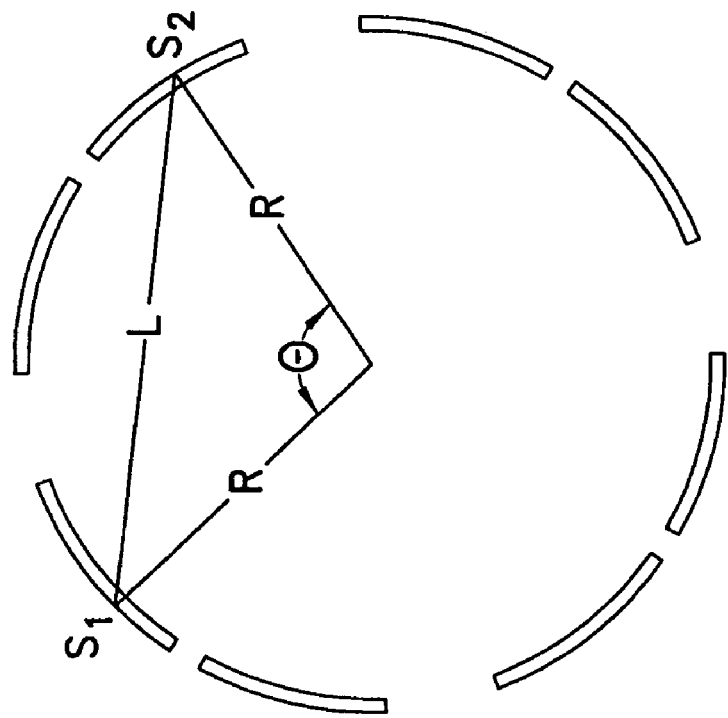
FIG. 3 is a plan view of borehole illustrating (a) the distribution of FMI™ sensors around perimeter of a 8.5 inch diameter borehole and (b) the vector of length L separating sensors $S_1$ and $S_2$ with angular separation $\theta$ in hole of radius R is given by $$L = 2R \sin\left(\frac{\theta}{2}\right).$$
Figure 4:
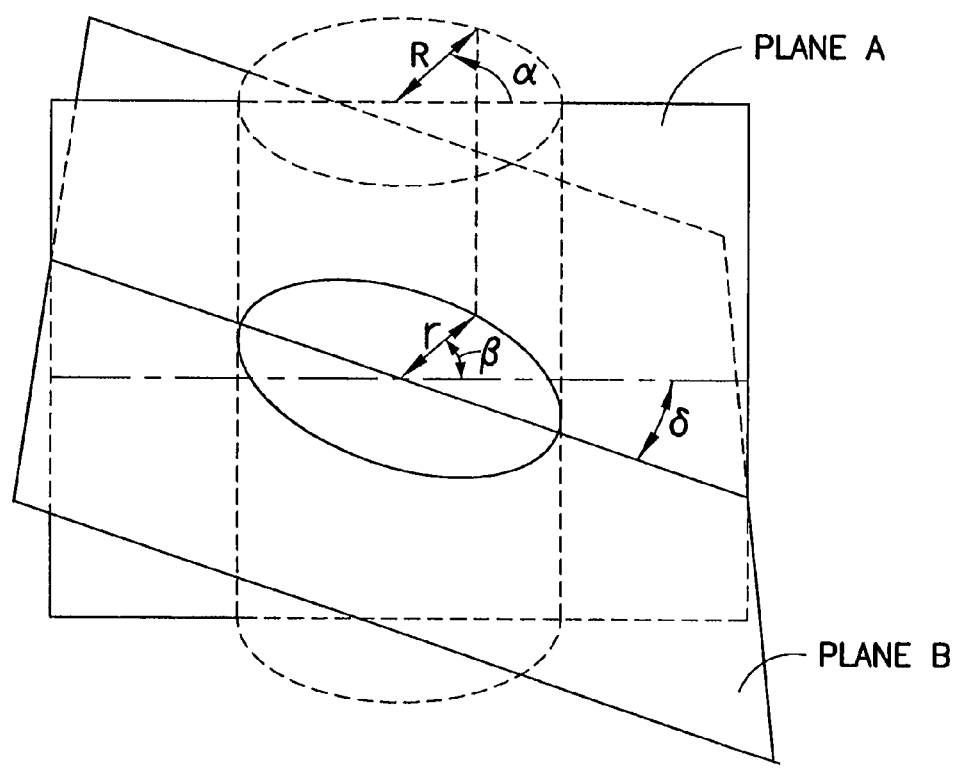
FIG. 4 is a schematic illustration of a three dimensional extension of the present invention.

While the examples presented here in are from a vertical well of constant diameter (8.5 inches) to simplify the analysis, the methodology may be extended to other configurations. FIG. 4 is a schematic diagram illustrating a section of a borehole (depicted as a cylinder) intersected by a geological bed (Plane B). The vertical Plane A is coincident with the borehole axis and the maximum apparent dip ($\delta$) of the bedding relative to the borehole. Knowledge of the sensor positions is useful to extend the theory illustrated in FIG. 3(b) and Equation (5) below on the ellipse formed by the intersection of Plane B with the borehole (shaded area in FIG. 4). The two parameters r (apparent radius) and $\beta$ (apparent azimuth) are computed. The following equations express these values in terms of a (the azimuth of the sensor), δ (dip to the sensor), and R (the radius of the borehole) which may be determined using tool measurements:

$$r^2 = R^2(1+\cos^2\alpha \tan^2\delta) \tag{3}$$

$$\sin^2\beta = \frac{\sin^2\alpha}{1+\cos^2\alpha\tan^2\delta} \tag{4}$$

Identify Two-Point Sensor Pairs

For the two-point geostatistical analysis, sensor pairs should be identified. Measurements are obtained over a continuous logging run; however, for simplicity, this example considers data collected from sensors at over a determined depth, and ignores the orientation of the vectors between the sensors (only their magnitude is considered). The full three-dimensional analysis is a straightforward extension of this reduced approach.

As noted above, there are 192 sensors per depth in the FMI™ Tool. As such, there are $$\frac{192 \times 191}{2} = 18336$$

possible sensor pairs. Once the 3D coordinate of each sensor is known, then the Euclidean distances between sensor pairs are trivially calculated (see FIGS. 3(a) and (b)):

$$L = 2R\sin\left(\frac{\theta}{2}\right) \tag{5}$$

Assign FMI™ Sensor Pairs to Bins with Similar Lags

Figure 3A:
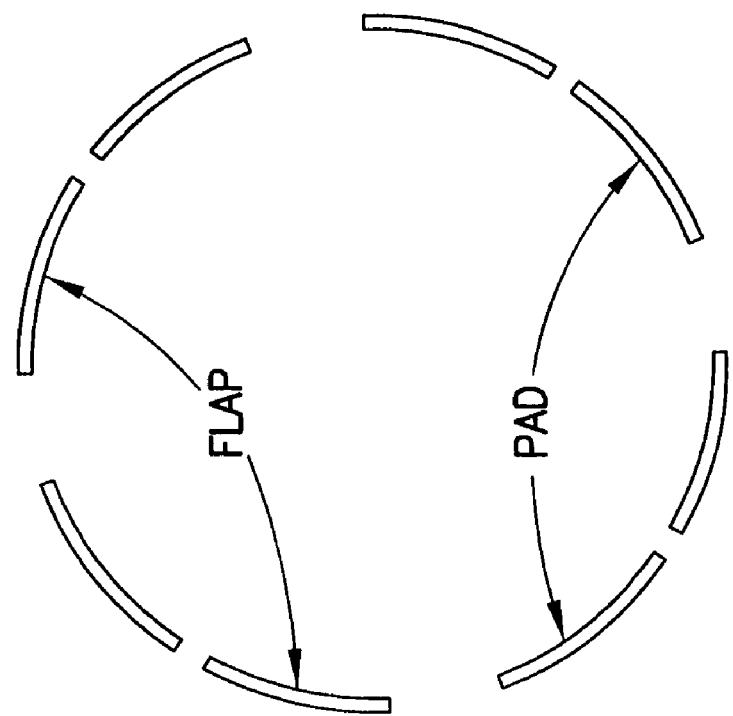
Figure 5:
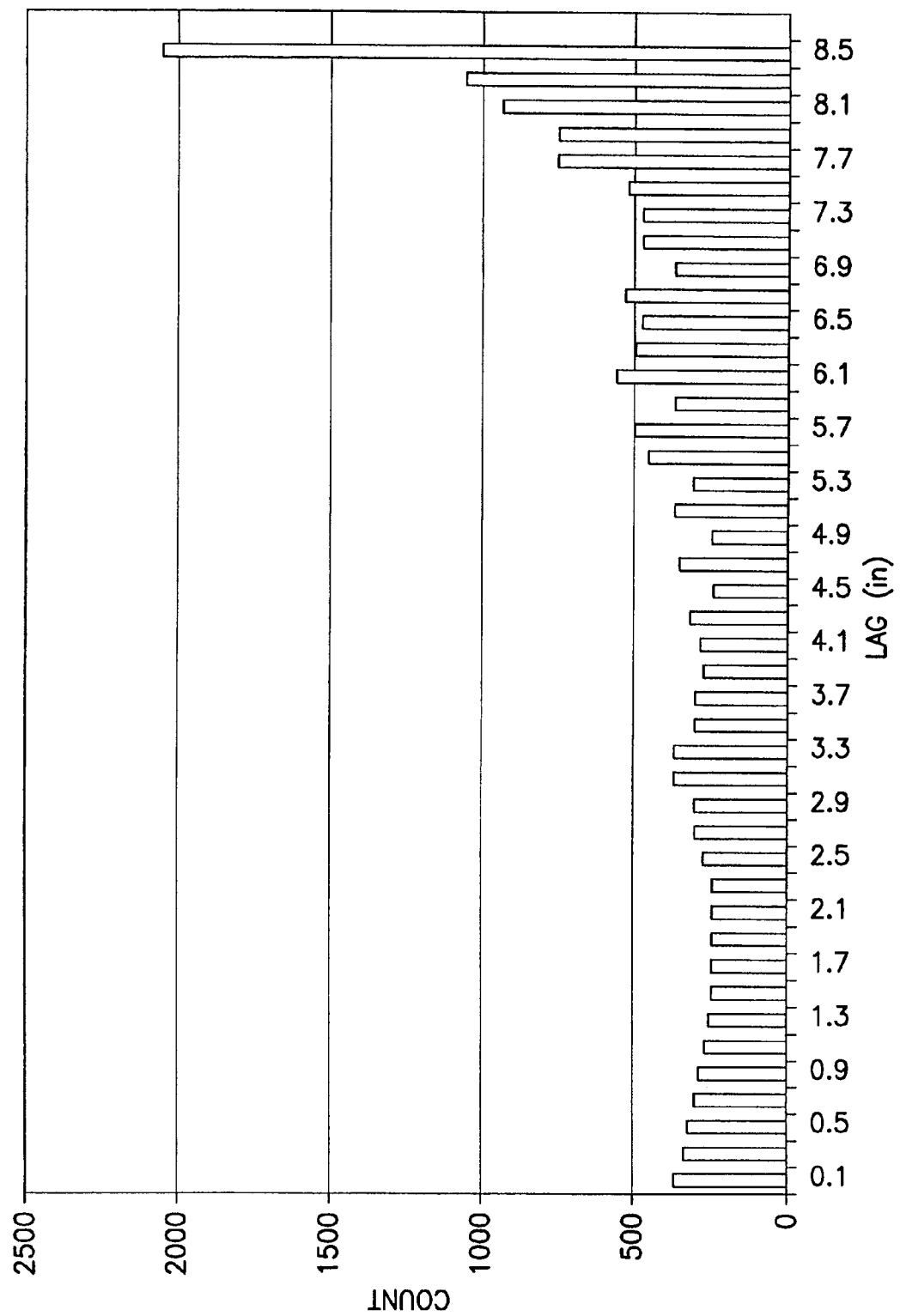
FIG. 5 is a histogram illustrating frequency of sensor pairs per 0.2 inch sampling bin for 8.5 inch diameter hole; Bin 1 is 0–0.2 inch, Bin 2 is 0.2–0.4 inch, etc.

For geostatistical analysis, these sensor pairs should be grouped by pairs into bins with similar L (lags, also referred to as relative distance). The maximum number of bins possible to achieve maximum resolution of the semi-variogram structure is preferred, but too small a bin size will result in aliasing (see Bloomfield, "Fourier Analysis of Time Series: An Introduction", 2$^{nd}$ Edition (2000) Wiley, page 261, incorporated by reference herein in its entirety). The correct minimum bin size is dictated by the Nyquist Frequency which is twice the sensor spacing (0.1 inches), i.e. 0.2 inches. For the 8.5-inch diameter hole example, this results in 43 bins of equal size (except the last which is 0.1 inches). Because of the trigonometric effects and non-uniform distribution of sensors as illustrated in FIGS. 3(a) and (b), the number of sensors in each of the 43 bins is not uniform as shown in FIG. 5.

Transform Normalized FMI™ Resistivity Image to Porosity Image

Once the sensor pairs and bins have been identified, the resistivity image is mapped to a geological or petrophysical property, so that this property can be analyzed in a geostatistical sense. While it is possible to use any attribute extracted from the resistivity image, for the purposes of this document, PoroSpect™ will be mirrored and Archie's transformation will be applied to analyze the porosity Φ of a each pixel of the image (see Equation (2)).

In applying Archie's transformation to the entire well, it is assumed that the Archie parameters in Equation (2): $S_w$, m, n, α, and $R_{mf}$ are constant over a given depth window in the borehole This assumption allows Equation (2) to be expressed as:

$$\Phi = \lambda R_{xo}^{-\gamma_m} \tag{6}$$

where $$\lambda = \left(\frac{aR_{mf}}{S_w^n}\right)^{\frac{1}{m}} \tag{7}$$

One of the assumptions, therefore, is that λ is constant for a given depth, but it can vary along the length of the well.

Rather than estimating λ from unknown Archie parameters, it can be eliminated from Equation (6) in the following manner.

From Equation (6), and the previous assumptions, at a given depth:

$$\langle \Phi \rangle = \lambda \left\langle R_{xo}^{-\frac{1}{m}} \right\rangle \tag{8}$$

where $\langle \ \rangle$ denotes the expectation or mean of the enclosed expression.

Equations (7) and (8) can be combined to eliminate λ yielding:

$$\frac{\Phi}{\langle \Phi \rangle} = \frac{R_{xo}^{-\frac{1}{m}}}{\left\langle R_{xo}^{-\frac{1}{m}} \right\rangle} \tag{9}$$

where $\left\langle R_{xo}^{-\frac{1}{m}} \right\rangle$ represents the mean value of $R_{xo}^{-\gamma_m}$ at the depth of interest and can be obtained from the resistivities of the image pixels, and $$\langle \Phi \rangle$$

represents the mean porosity at the given depth and can be obtained from conventional low resolution porosity logging tools. This approach of using a low resolution measurement to calibrate a high resolution measurement has been described previously (see Flaum et al., "Enhanced Resolution Processing of Compensated Neutron Logs", (1986) SPE 15541 (incorporated by reference herein in its entirety).

Note, due to heterogeneity $$\langle \Phi \rangle$$

has its own heterogeneity index (defined below) because it is a logging measurement. This uncertainty can be integrated into the final heterogeneity calculations.

Compute Experimental Semi-Variogram

Now that the porosity data has been acquired and the bins defined, sample variance for each bin h(i) can be computed with the conventional experimental variogram equation (see Clark, *Practical Geostatistics*, Elsevier Applied Science Publishers, Ltd. (1984)):

$$2\gamma^*[h(i)] = \langle(\Phi_{t+h} - \Phi_t)^2\rangle; i = \{1, 2, \ldots, k\} \text{ where } \langle \rangle \quad (10)$$

again denotes expectation or mean, and k is the number of bins.

Model Semi-Variogram

For the purposes of this analysis, a simple semi-variogram model has been defined to fit the experimental data from Equation (10):

$$\gamma(h) = C^0 + C[1 - e^{-(h/L)^2}] \quad (11)$$

Thus, the model semi-variogram γ is a function $C^0$ (nugget effect) and the Gaussian model C (sill) and L (range or correlation length).

Over the past 20 years that has been a great deal of research into the optimal way to fit a model semi-variogram of Equation (11) to the experimental semi-variogram of Equation (10) (see Cressie, "Fitting Variogram Models by Weighted Least Squares", Mathematical Geology (1985) 17, pages 563–588 (incorporated by reference herein in its entirety) and Zhang et al., "On the Weighted Least-Squares Method for Fitting a Semivariogram Model", Computers and Geosciences (1995) 21, pages 605–608). It was found that the method of Zhang et al. yields the most satisfactory results. This method involves minimizing the cost criterion J (λ):

$$J(\lambda) = \sum_{i=1}^{k} \frac{N_{h(i)}}{h(i)^2} [\gamma^*(h(i)) - \gamma(h(i))]^2 \quad (12)$$

where $N_{h(i)}$ is the number of pairs in bin h(i).

Figure 6:
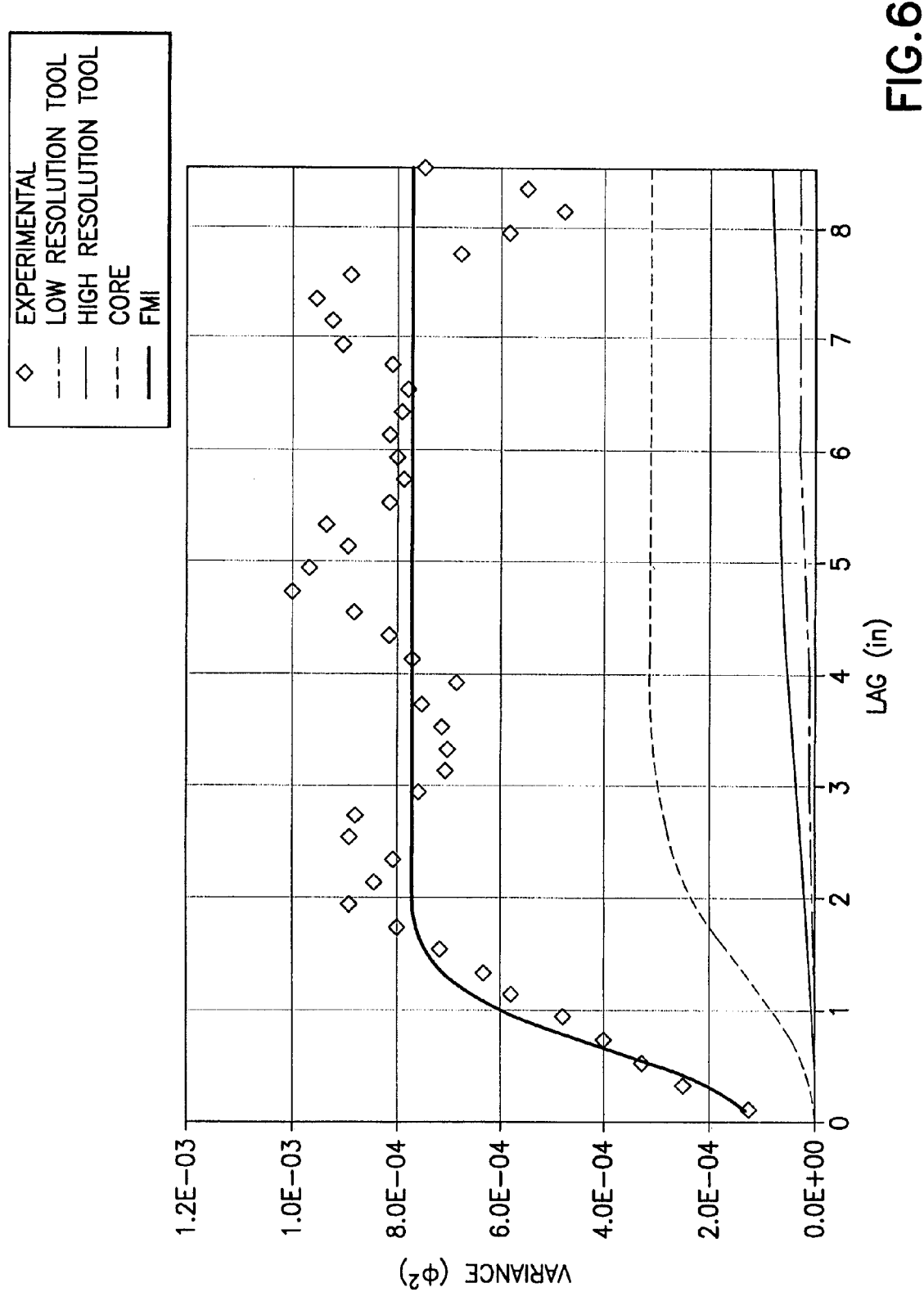
FIG. 6 is a horizontal semi-variogram (for the middle of the interval of FIG. 12) illustrating experimental data from the FMI™ as well as the modeled semi-variogram for FMI™, core plug, a high resolution tool, and a low resolution tool.

In FIG. 6, the resulting model semi-variogram is plotted along with the experimental semi-variogram. Superimposed on the experimental data obtained from the porosity image are model variograms for FMI, Core Plug, High Resolution Tool, and Low Resolution Tool. In the experimental data, note the sill with $\Phi^2=0.00077$ ($\Phi=2.8\%$) reached at a lag of approximately 2 inches. This analysis can be repeated at every depth with imagery in the borehole. The resulting vectors of $C^0$, C, and L can then be plotted as conventional logs. Examples of this is illustrated in FIGS. 10(*a*) and (*b*).

Upscaling

Now that the experimental semi-variogram observed at the small (e.g. FMI™) scale has been modeled, the model may be upscaled to other volumes of investigation.

Figure 7:
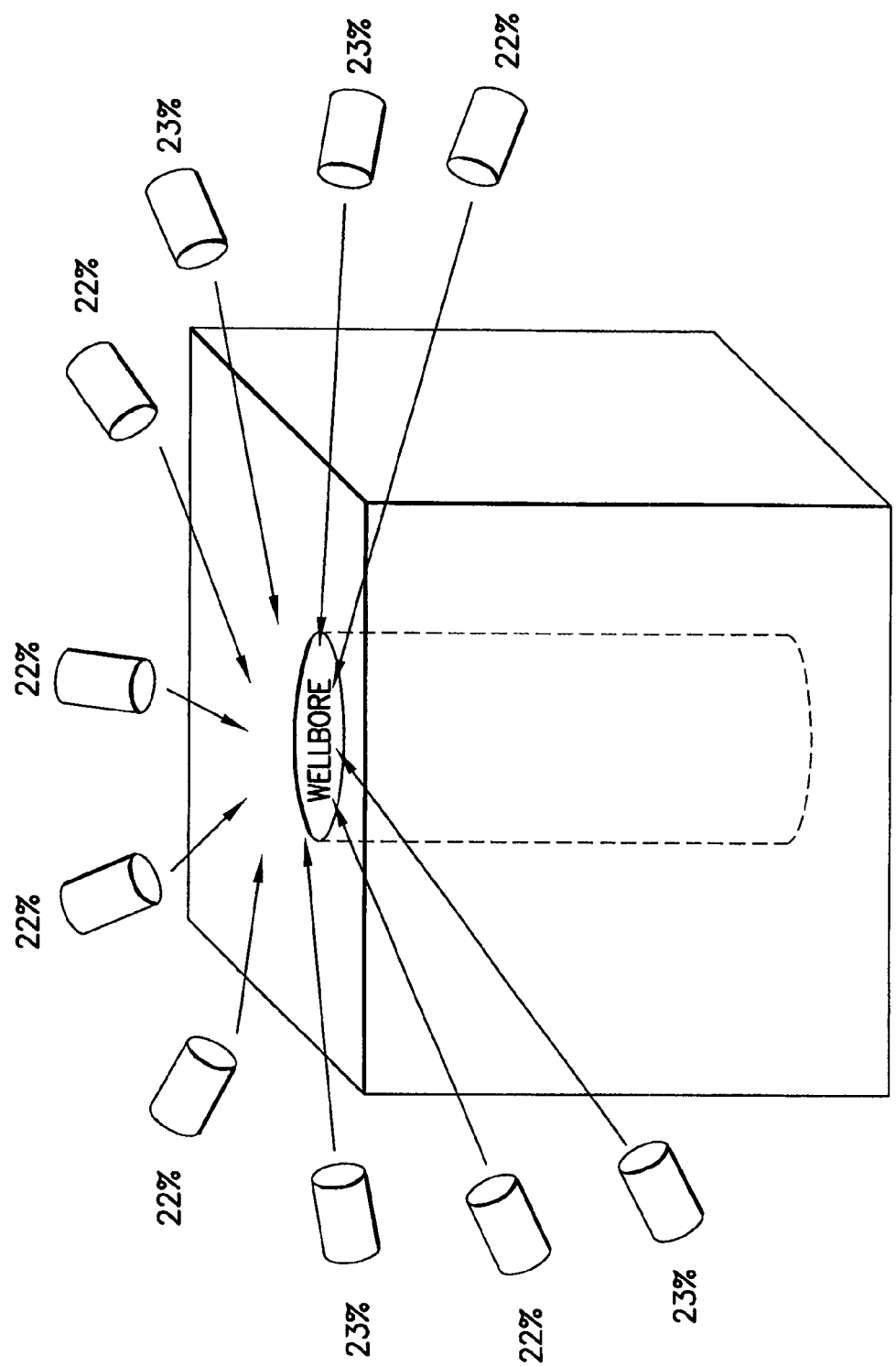
FIG. 7 is a conceptual diagram of a series of 11 core plugs and their measured porosity values taken from a homogeneous carbonate.
Figure 8:
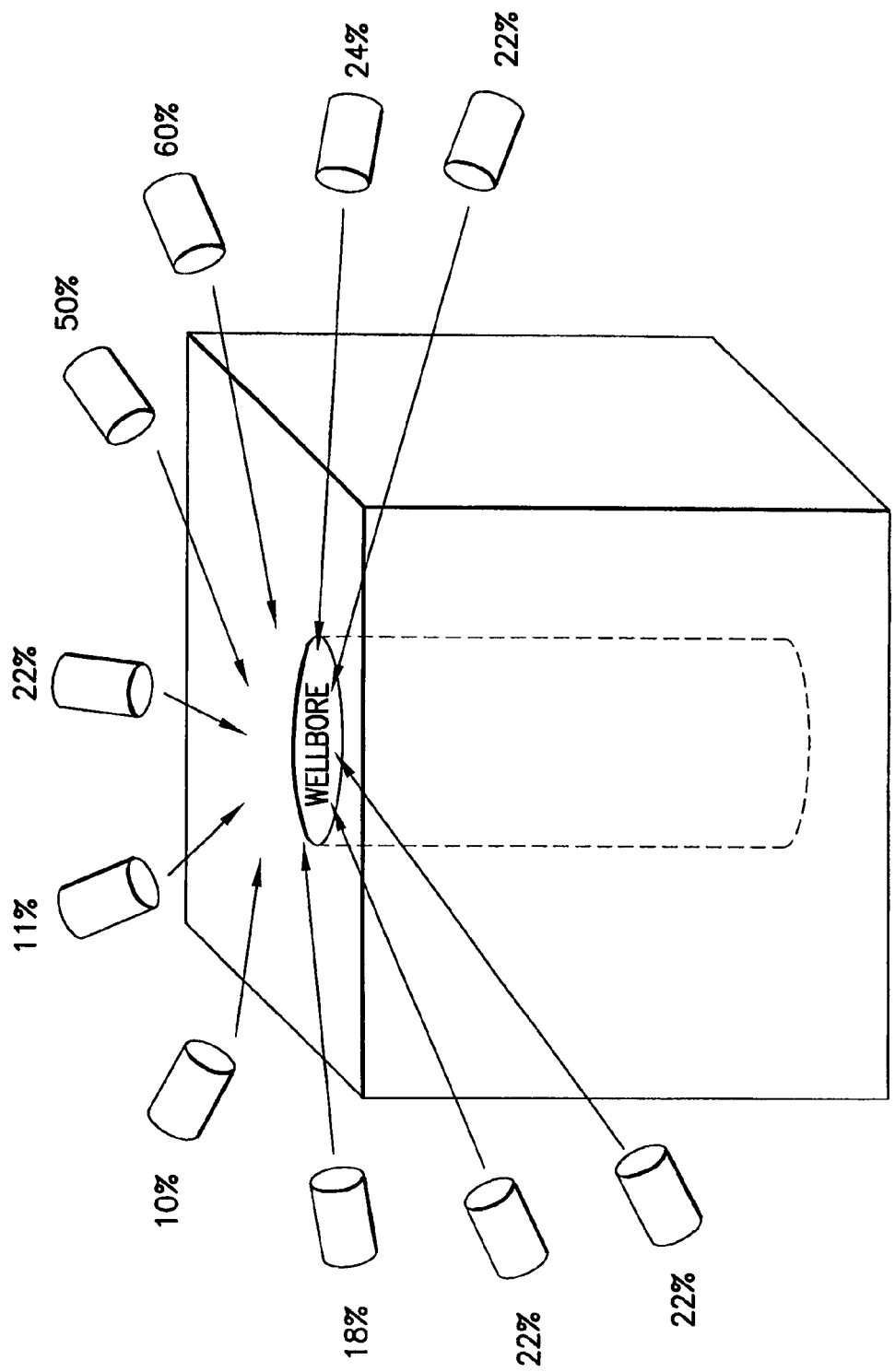
FIG. 8 is a conceptual diagram of a series of 11 core plugs and their measured porosity values taken from a heterogeneous carbonate.

FIG. 7 is a conceptual design of a series of 11 core plugs and their measured porosity values taken from a homogeneous carbonate. For the homogeneous core plugs, the measured porosity at the core plug scale does not vary. By contrast, for the heterogeneous core plugs of FIG. 8, the measured porosity at the core plug scale is highly variable, depending on whether an individual plug intersects a large hole or a low porosity cemented region. A porosity measurement with a larger volume of investigation (such as a density tool) would read an average of a few plugs, thus having a smaller variance.

In addition to FMI™ and core plug measurement volumes, two logging tool measurement volumes have been considered in this analysis: the high resolution and low resolution porosity tools. The modeled dimensions of these various measurement volumes are listed in Table 1.

TABLE 1

Dimensions of modeled rectangular prism volumes of various measurements

| Measurement | Width (in) | Height (in) | Depth (in) | Volume (in³) | Volume (relative) |
| --- | --- | --- | --- | --- | --- |
| FMI ™ Sensor | 0.1 | 0.1 | 0.1 | 0.001 | 1x |
| Core Plug | 1.0 | 1.0 | 1.0 | 1.0 | 1,000x |
| High Resolution Tool | 3.0 | 3.0 | 3.0 | 27.0 | 27,000x |
| Low Resolution Tool | 3.0 | 12.0 | 4.0 | 144.0 | 144,000x |

Figure 9:
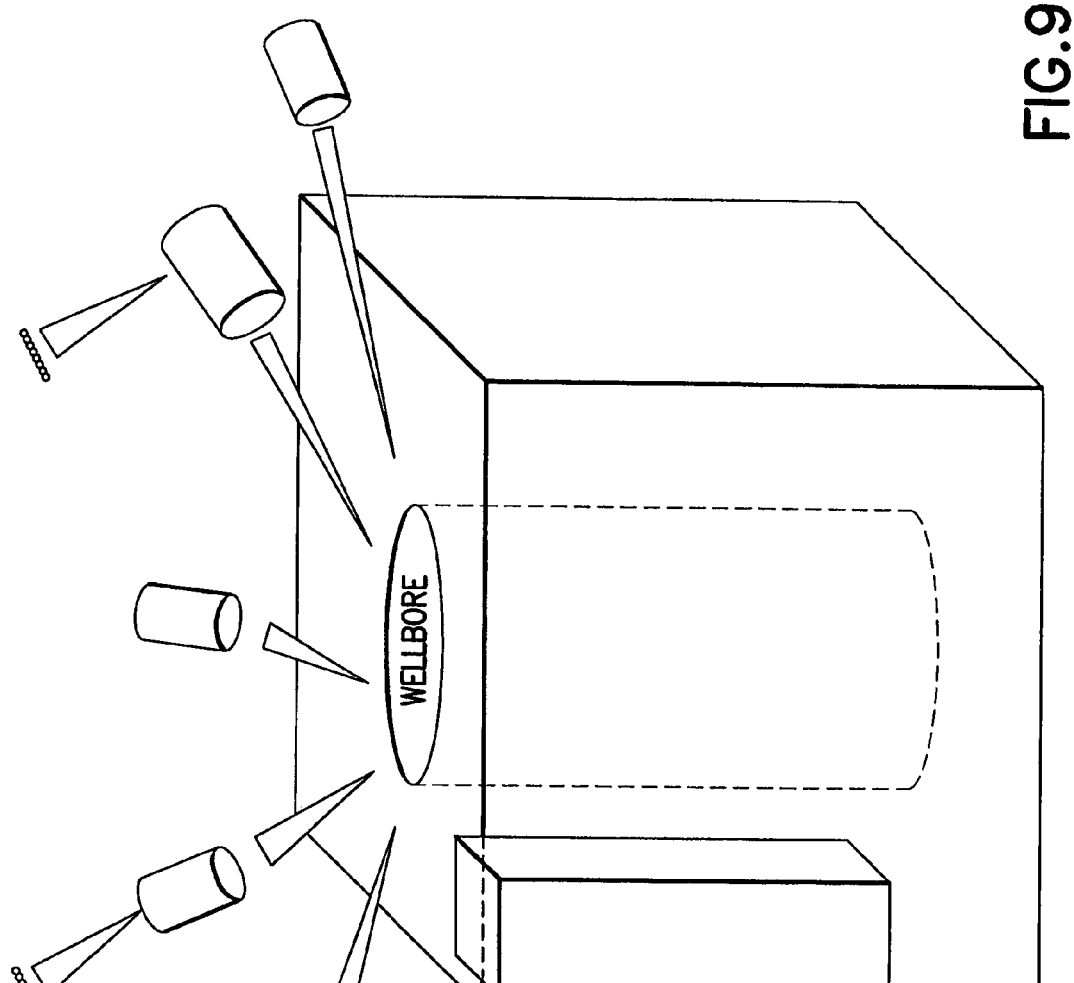
FIG. 9 is a conceptual diagram illustrating the relative volumes of FMI™ measurements, core plugs, and a density log.

FIG. 9 is a conceptual diagram of the relative volumes (scale effects) of FMI™ measurements, core plugs and a density tool. A set of porosity measurement taken with the density tool at the location of each core plug reads the average of numerous core plugs and will thereby have a smaller variance than the same set of core plugs. Because the average measurements taken by the porosity tool will cover overlapping regions, there will not be a large variance between measurements. By contrast, FMI™ measurements have a larger variance than core plug measurements.

If two finite volumes of investigation v (small volume) and V (large volume) are considered, then it is possible to derive the geostatistical parameters for V (i.e. $C_V^0$, $L_V$ and $C_V$) from the modeled geostatistical parameters for v (i.e. $C_v^0$, $L_v$ and $C_v$).

To upscale the nugget effect $C^0$ in Equation (11) it can be shown (Frykman et al., "Geostatistical Scaling Laws Applied to Core and Log Data", (1999) SPE 56822, incorporated by reference herein in its entirety):

$$C_V^0 = C_v^0 \frac{v}{V} \quad (13)$$

It can also be shown (see Frykman et al.) that the range (L) in Equation (11) increases as a function of the increase in volume size:

$$L_V = L_v + (|V| - |v|) \quad (14)$$

where |V| and |v| are the dimensions (lengths) of the volumes V and v in the direction of L.

Finally, to upscale the modeled sill C in Equation (11), the concept of the point scale sill ($C_p$) is introduced. $C_p$ is defined as the sill for an infinitesimally small volume of investigation. Then, for the small finite volume v, the decrease in sill is defined as follows:

$$C_p - C_v = C_p \bar{\gamma} v \quad (15)$$

where $C_p \bar{\gamma} v$ is the point-scale sill within the volume v, and $\bar{\gamma} v$ is the normalized point-scal sill in v (defined below in Equation (17)).

Equations (14) and (15) are then combined to eliminate the point scale sill $C_p$ yielding the following definition for $C_V$:

$$C_V = C_v \frac{1-\Gamma_V}{1-\Gamma_v} \quad (16)$$

The normalized point-scale sill in v is obtained from the double volume integral:

$$\Gamma_v = \frac{1}{v^2} \int_v \int_v \Gamma_p(|\bar{x}-\bar{y}|) dx\, dy \quad (17)$$

where [x−y], is the Euclidean distance between points $\bar{x}$ and $\bar{y}$, and $\Gamma_p$ is the normalized point scale model semi-variogram expressed as:

$$\Gamma_p(|\bar{x}-\bar{y}|) = 1 - e^{-\left(\frac{|\bar{x}-\bar{y}|}{L_v-|v|}\right)^2} \quad (18)$$

where $L_v-|v|$ is the modeled point scale range form Equation (11).

Similarly, $\Gamma_V$ is expressed as:

$$\Gamma_V = \frac{1}{V^2} \int_V \int_V \Gamma_p(|\bar{x}-\bar{y}|) dx\, dy \quad (19)$$

Figure 10A:
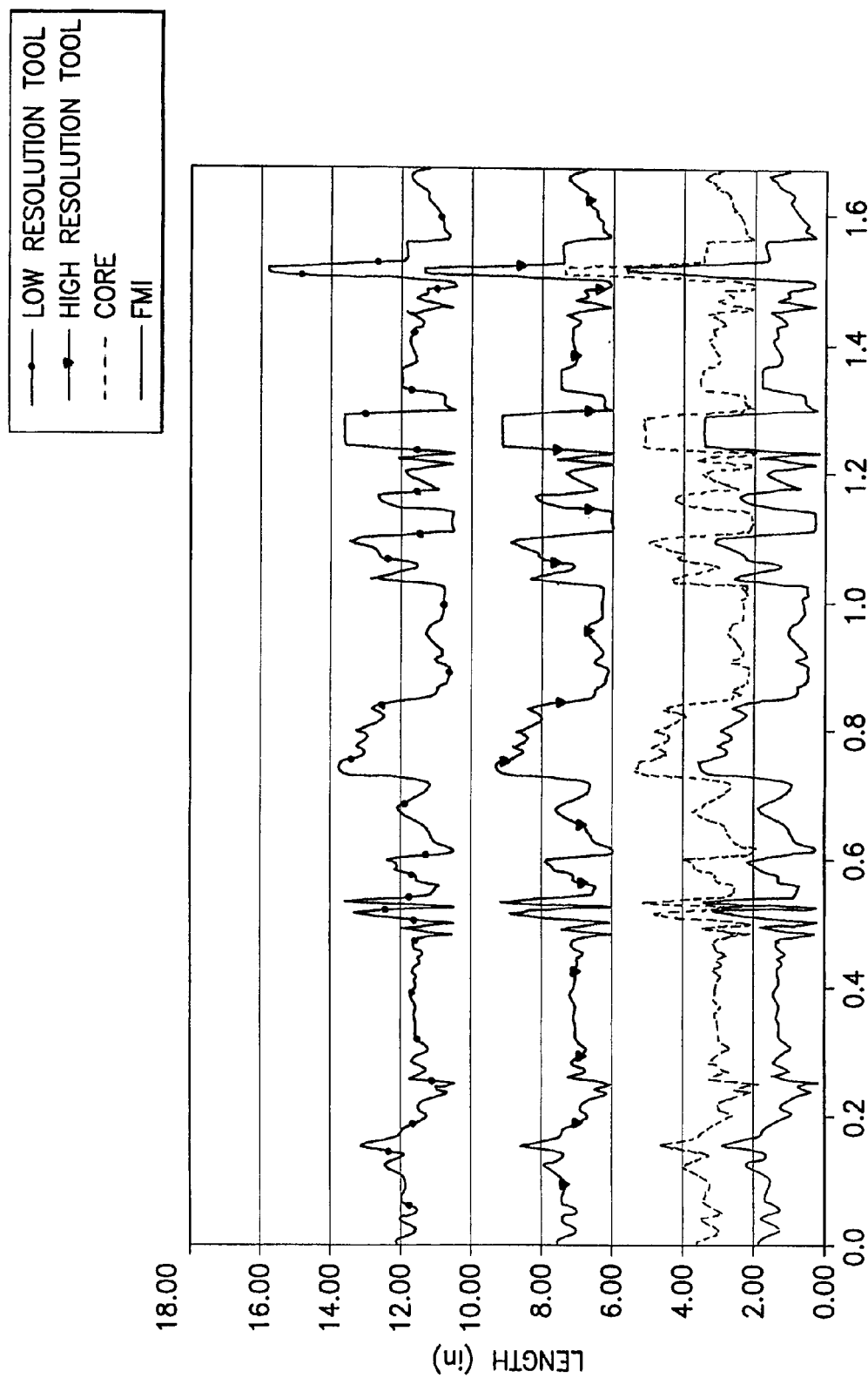
FIGS. 10(a) and (b) are graphs of modeled semi-variogram parameters as a function of depth and (a) lag (L) and (b) sill (C) for various volumes of investigation v: FMI™, Core Plug, High-resolution density porosity, Low-resolution density porosity.
Figure 10B:
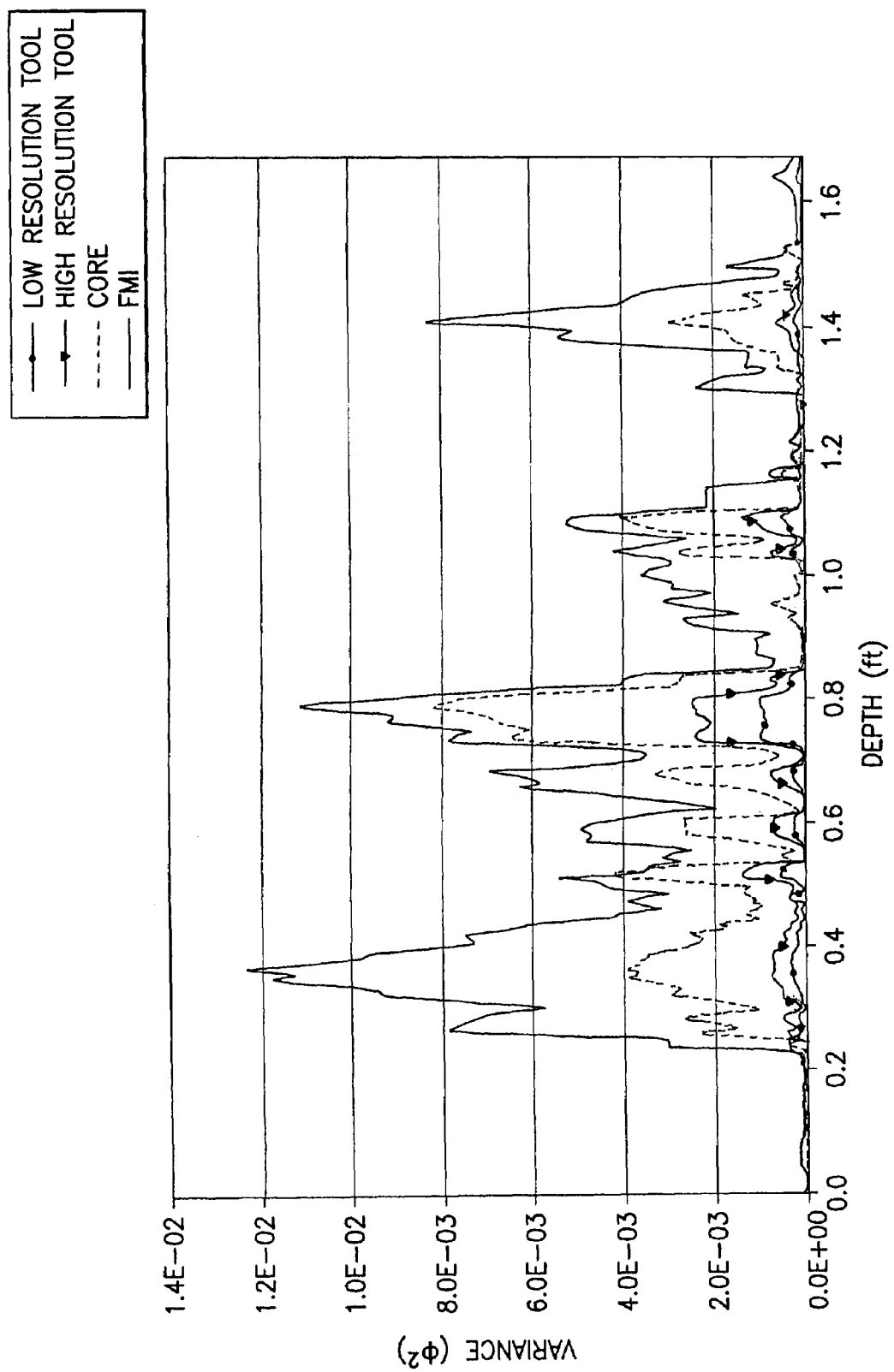

Having upscaled the geostatistical parameters to the larger measurement volumes (Table 1) over the entire relevant depth range of the borehole, it is now possible to present these data as well logs (see FIGS. 10(a) and (b)). Note that L increases as v increases and C decreases as v increases.

Construct Heterogeneity Index Logs for Porosity Measurements

For the purposes of this discussion, heterogeneity Index $\Psi_V$ is defined as:

The standard deviation due to heterogeneity of a measurement that samples a volume V.

In other words, measurements sampling a volume V over volumes separated by a distance greater than $L_V$ (Equation (14)) will vary with a standard deviation $\Psi_V$. Further, the sample variance due to heterogeneity is then given by $\Psi_V^2$.

For a simple model semi-variogram, the magnitude of the sill is equivalent to the sample variance (see Clark, *Practical Geostatistics*, Elsevier Applied Science Publishers, Ltd. (1984)). $\Psi_V$ can therefore be expressed in terms of the proposed upscale parameters $C_V^0$ and $C_V$.

$$\Psi_V^2 = C_V^0 + C_V \quad (20)$$

Figure 11:
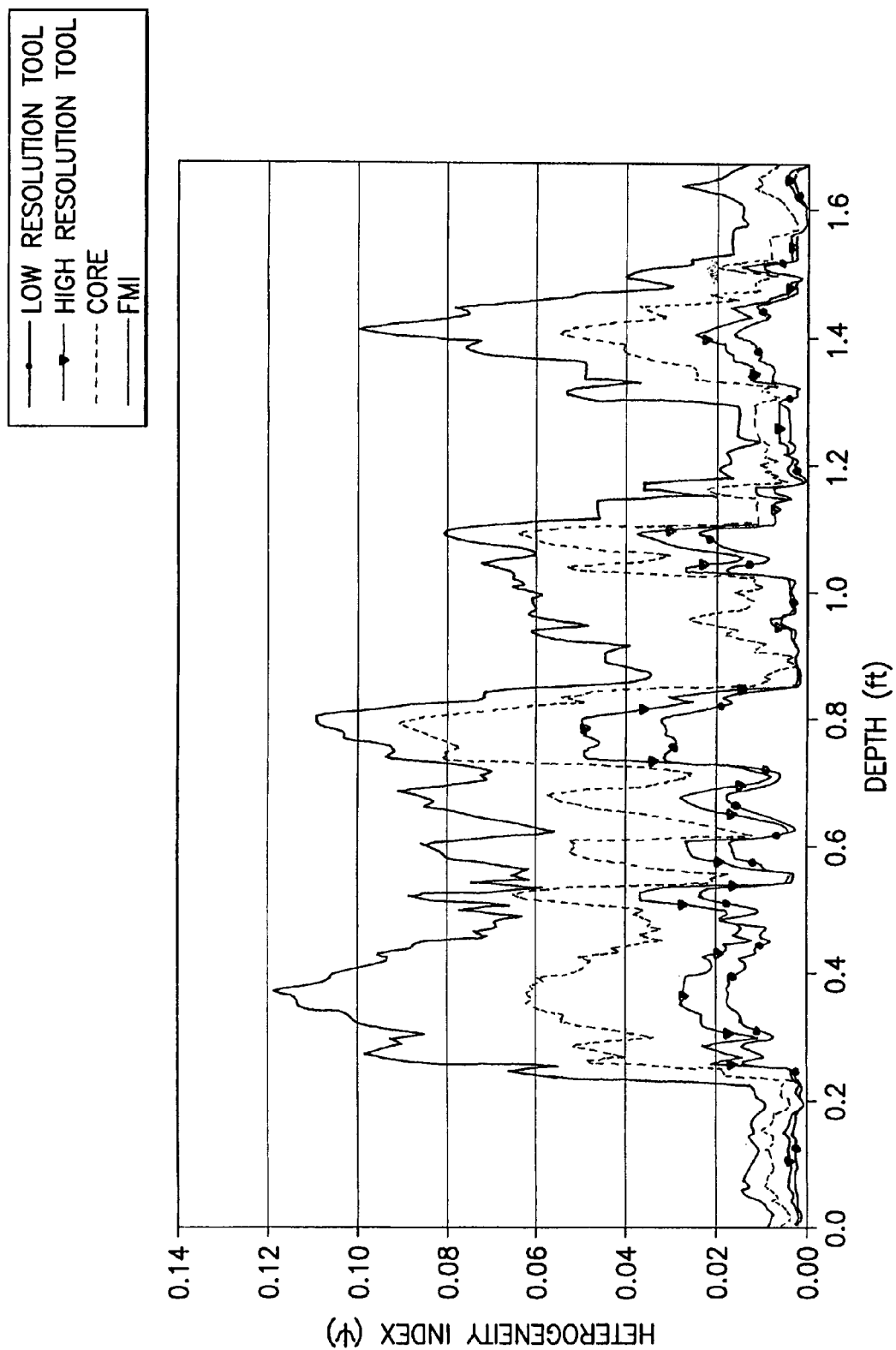
FIG. 11 is a log of heterogeneity index $\Psi_{\Phi,v}$ as a function of depth in the borehole.

Thus, Equation (20) allows the computation of the heterogeneity index for all of the idealized volumes of Table 1 at each imaged depth in the well. This is illustrated by the example heterogeneity index log ($\Psi_{\Phi,V}$ as function of depth) in FIG. 11. Note that this interval exhibits significant heterogeneity at all scales; further, $\Psi$ is as high as 12% for the FMI scale and 9% for the core plug scale.

Figure 15:
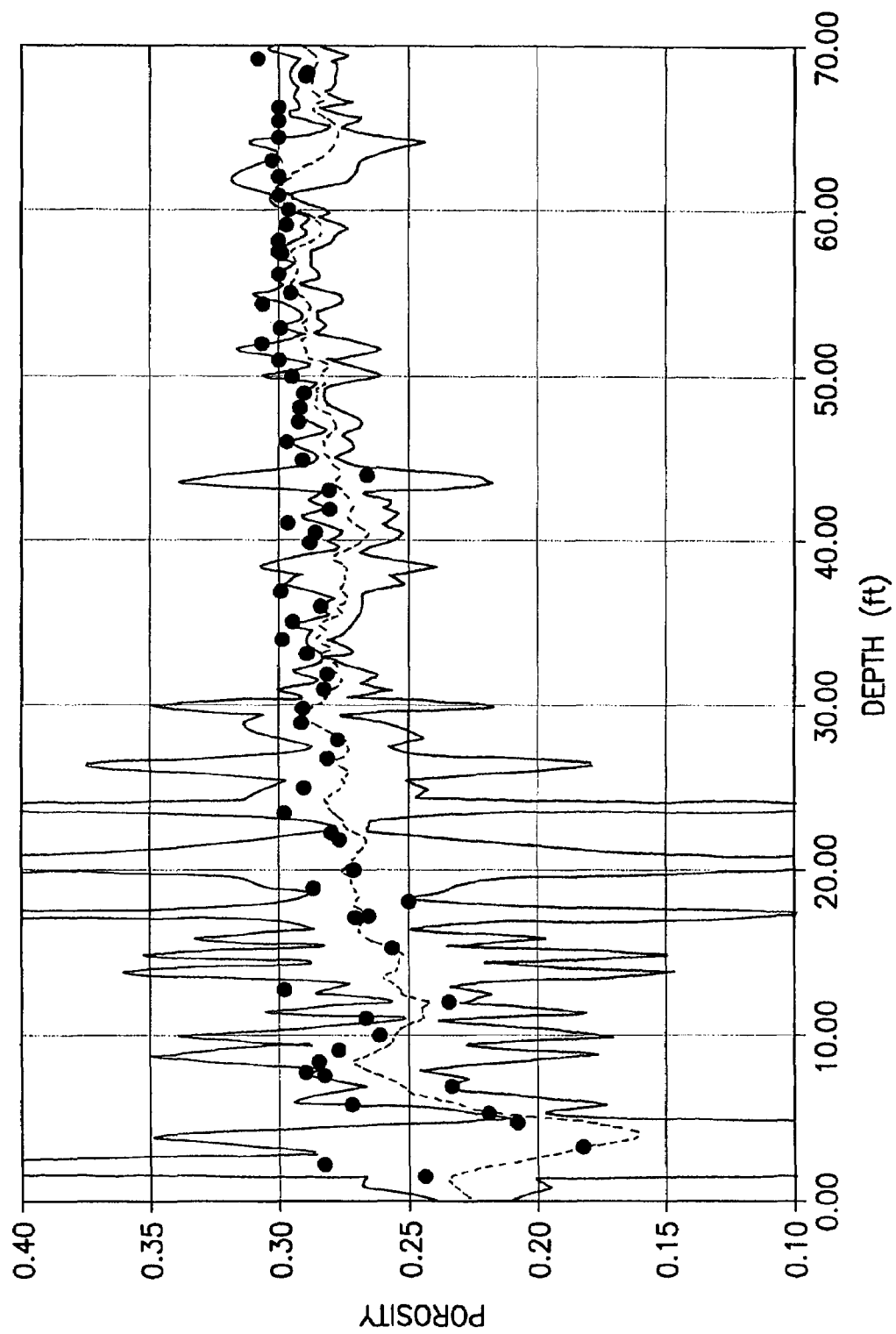
FIG. 15 is a composite porosity log displaying logging tool porosity with core plug porosity.

Porosity logs for a particular tool (e.g. density porosity), or measurement (e.g. core plug) can then be expressed with heterogeneity index envelopes as shown in FIG. 15.

DISCUSSION

Figure 12:
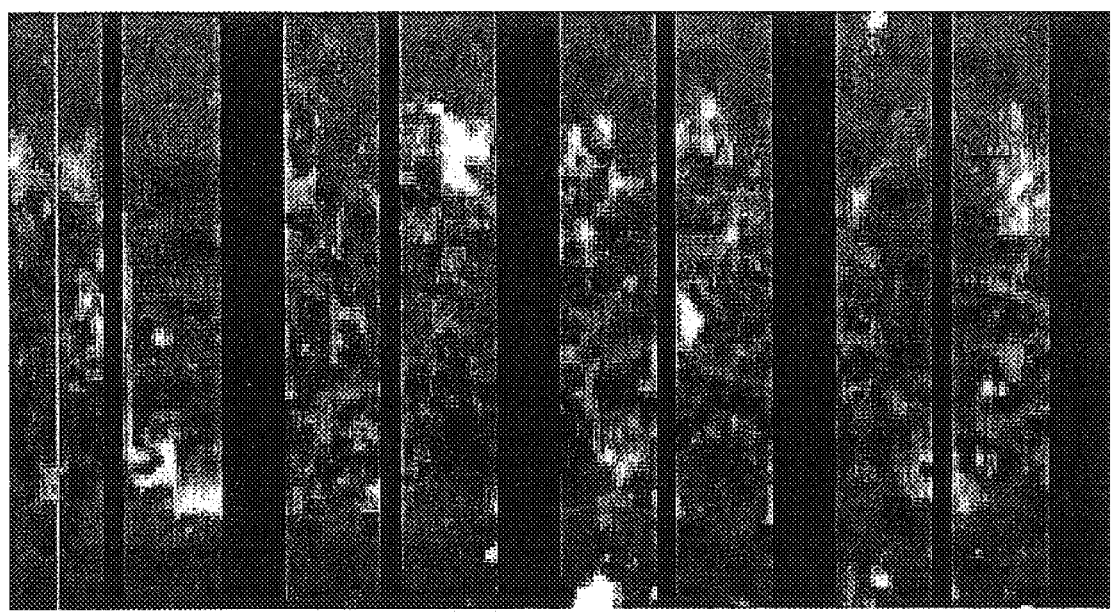
FIG. 12 is a porosity image of 30 inch interval with fossiliferous layer containing 1–2 inch diameter rudists and having a mean porosity of approximately 18%.
Figure 13:
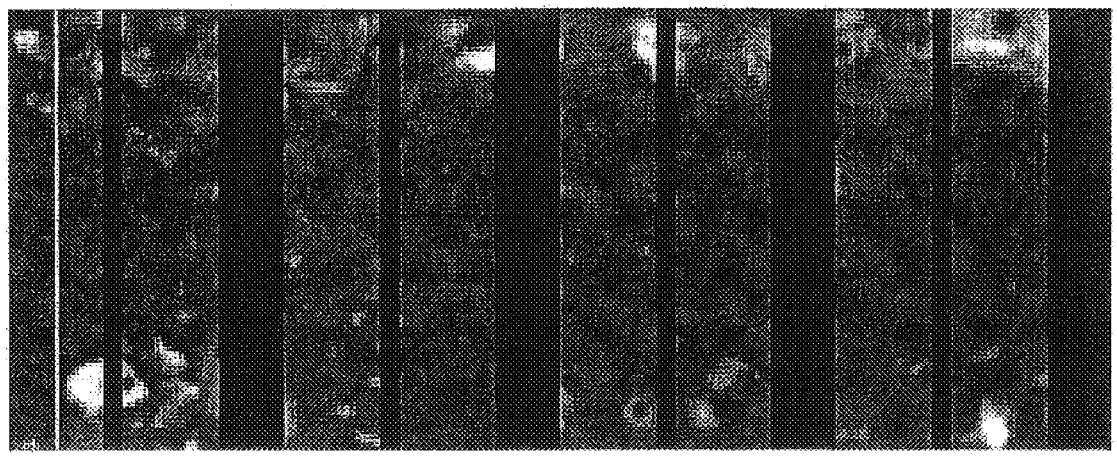
FIG. 13 is a porosity image of 22 inch high interval exhibiting mean porosity of approximately 22%.

FIG. 13 is a section of the reservoir having moderate porosity (22%) and relatively small objects less than an inch in diameter. The semi-variogram from this section (see FIG. 14) illustrates a relatively short range (approximately 0.4 inches) corresponding to the visual size of the objects. [This can be compared to the interval presented above in FIG. 12, with a relatively long range of 0.86 inches.]

Figure 14:
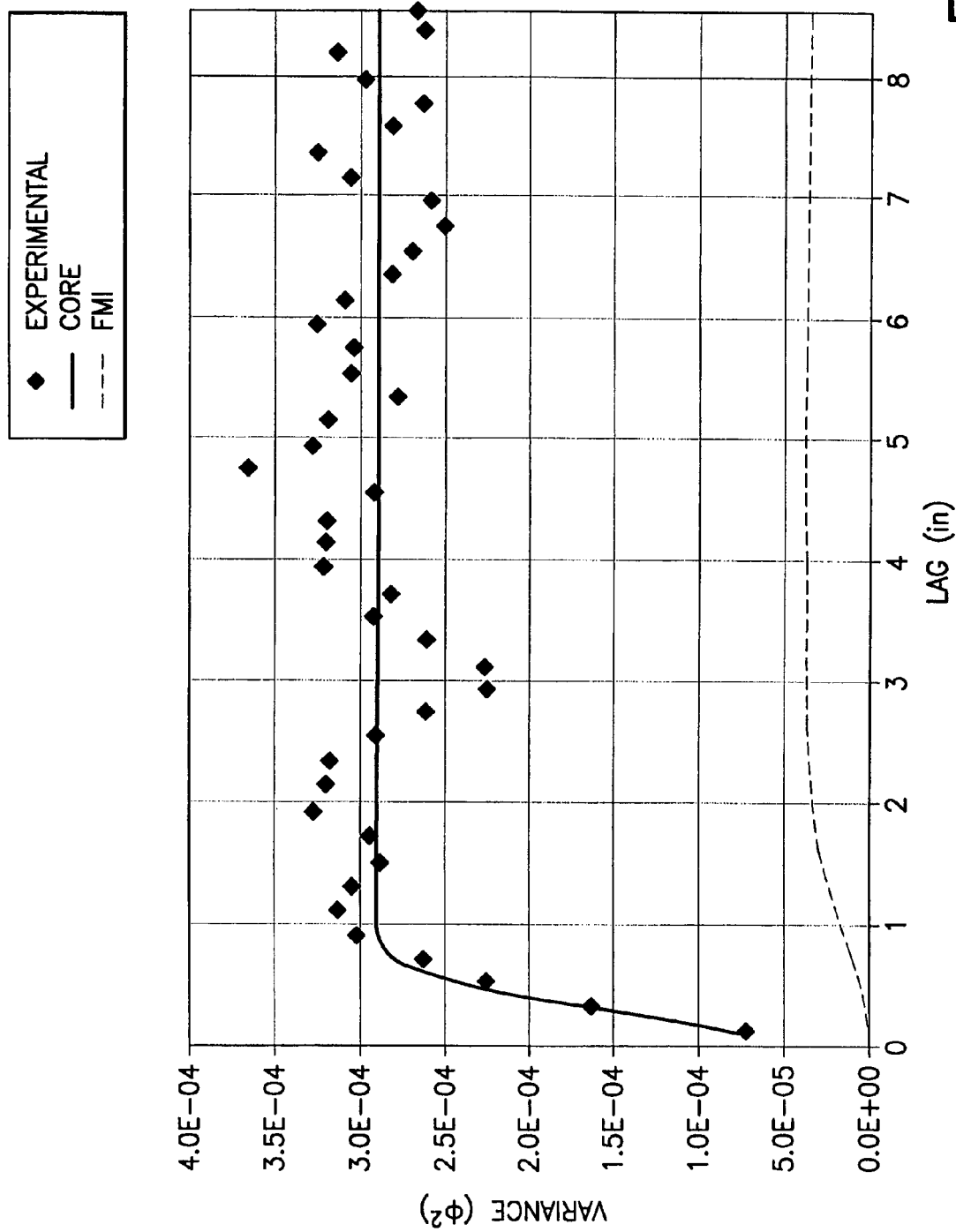
FIG. 14 is a horizontal semi-variogram for the middle of the interval displayed in FIG. 13.

While the different variogram ranges appear to be consistent with the different geology in these intervals, the effect on the upscaled heterogeneity is perhaps more interesting. The short range seen in FIG. 14 is responsible for the relatively small upscaled heterogeneity index compared to that in FIG. 6. Note that the FMI™ scale sill with ($\Phi^2=0.00029(\Phi=1.7\%)$ is reached at a lag of approximately 1 inch. Also note that the very low upscaled sills, e.g. $\Phi^2_{coreplug}=0.000036(\Phi=0.6\%)$, result from the effect of the relatively low range (as compared to FIG. 6).

The effect is computed from the upscaling equations. This predicted relationship between short range yielding greater suppression in upscaled heterogeneity also intuitively makes sense: small objects will not be resolved when the sample volume is large, while large objects will be resolved. Thus, it is clear that an understanding of the geostatistics and varying ranges is preferred to reconcile the heterogeneity observed at the different scales of measurement.

A comparison of the predicted heterogeneity at the core plug scale of measurement with actual core plug porosity measurements is illustrated in FIG. 15. In both the heterogeneous and homogeneous intervals, the predicted and observed core plug heterogeneity are remarkably consistent. Therefore, the apparent discrepancy can be explained by heterogeneity. Also shown in this figure is the $\pm 2\Psi_{core\ plug}$ envelope around the logging tool porosity. It is noted that, as predicted, approximately 2σ of the core plug measurements fall within the heterogeneity index envelope. Further, the log straddles a heterogeneous zone above (0–32 feet) and a homogeneous zone below (32–70 feet). The differences in heterogeneity between the two zones are reflected in both the heterogeneity index log and the core plug measurements.

While the invention has been described herein with reference to certain examples and embodiments, it will be evident that various modifications and changes may be made to the embodiments described above without departing from the scope and spirit of the invention as set forth in the claims.

What is claimed is:

1. A method of characterizing a borehole traversing an earth formation, comprising:
   a) obtaining an array of data from a formation characterization tool, wherein said data describes a section of said borehole;
   b) computing at least one spatial characteristic describing the relative position of pairs of data;
   c) assigning said pairs of data to bins based on said spatial characteristic, wherein the size of said bins are selected based on said tool;
   d) transforming said data to petrophysical properties of said borehole;
   e) calculating the variance of each bin;
   f) developing a model of said variances;
   g) determining at least one geostatistical parameter using said model; and
   h) upscaling said geostatistical parameters to characterize a region of said earth formation.

2. The method of claim 1, further comprising:
i) generating a heterogeneity index log using said geostatistical model parameters.

3. The method of claim 1, wherein said array of data describes a substantially continuous section of said borehole.

4. The method of claim 1, wherein said array of data is an array of pixels.

5. The method of claim 1, wherein said array of data is selected from the group consisting of resistivity data, density data, and acoustic impedance data.

6. The method of claim 1, further comprising determining the coordinates of said data.

7. The method of claim 6, wherein said coordinates are based on the borehole geometry, tool geometry, and tool orientation.

8. The method of claim 7, wherein said spatial characteristics describes at least one of the distance between data pairs, the depth of said data pairs, and the orientation of said data pairs.

9. The method of claim 1, wherein said spatial characteristic include the distance between data pairs and the orientation of said data pairs, and wherein said upscaling further includes developing a three dimensional characterization of said earth formation.

10. The method of claim 1, wherein developing a model of the variances includes:
a) computing the variance of the spatial characteristic of each bin;
b) computing an experimental semi-variogram using said variances;
c) deriving a model semi-variogram from said experimental semi-variogram; and
d) determining the geostatical parameters using said model semi-variogram.

11. A computer program product for processing and interpreting borehole data, comprising:
a) a computer useable medium having computer readable program code embodied in said medium for processing borehole data, said computer program product having:
b) computer readable program code means for computing at least one spatial characteristic describing the relative position of pairs of data, wherein said data describes a borehole;
c) computer readable program code means for assigning said pairs of data to bins based on said spatial characteristics, wherein the size of said bins are selected based on the tool used to collect the data;
d) computer readable program code means for transforming said data to petrophysical properties of said borehole;
e) computer readable program code means for determining the variance of each bin;
f) computer readable program code means for developing a model of said variances;
g) computer readable program code means for determining at least one geostatistical parameter using said model; and
h) computer readable program code means for upscaling said geostatistical parameters to characterize a region of said earth formation.

12. The computer program product of claim 11, further comprising:
i) computer program code means for generating a heterogeneity index log using said geostatistical model parameter.

13. The computer program product of claim 11, wherein said array of data describes a substantially continuous section of said borehole.

14. The computer program product of claim 11, wherein said array of data is an array of pixels.

15. The computer program product of claim 11, wherein said array of data is selected from the group consisting of resistivity data, density data, and acoustic impedance data.

16. The computer program product of claim 11, wherein said code means records the coordinates of said data.

17. The computer program product of claim 16, wherein said coordinates are based on the borehole geometry, tool geometry, and tool orientation.

18. The computer program product of claim 17, wherein said spatial characteristics describes at least one of the distance between data pairs, the depth of said data pairs, and the orientation of said data pairs.

19. The computer program product of claim 11 wherein said computer readable program code means for upscaling further includes means for developing a three dimensional characterization of said earth formation.

20. The computer program product of claim 11, computer readable program code means for developing a model of said variances includes program codes means to:
a) compute the variance of the spatial characteristic of each bin;
b) compute an experimental semi-variogram using said variances;
c) derive a model semi-variogram from said experimental semi-variogram; and
d) determine the geostatical parameters using said model semi-variogram.

* * * * *